(12) United States Patent
Doehrer

(10) Patent No.: US 6,626,259 B2
(45) Date of Patent: Sep. 30, 2003

(54) SAFETY SEAT

(75) Inventor: Eckhardt Doehrer, Neustadt (DE)

(73) Assignee: Team Rosberg GmbH, Neustadt (DE)

( * ) Notice: Subject to any disclaimer, the term of this patent is extended or adjusted under 35 U.S.C. 154(b) by 0 days.

(21) Appl. No.: 09/986,819

(22) Filed: Nov. 13, 2001

(65) Prior Publication Data

US 2002/0038966 A1 Apr. 4, 2002

Related U.S. Application Data

(63) Continuation of application No. PCT/EP00/04356, filed on May 15, 2000.

(30) Foreign Application Priority Data

May 18, 1999 (DE) .......................................... 199 22 781

(51) Int. Cl.[7] .............................. B60R 21/02; B60N 2/42
(52) U.S. Cl. .................. 180/271; 280/748; 297/216.16
(58) Field of Search ....................... 180/271; 297/216.1, 297/216.11, 216.12, 216.13, 216.14, 216.15, 216.16, 216.17, 216.18, 216.19, 487, 488; 296/68.1; 280/748, 751

(56) References Cited

U.S. PATENT DOCUMENTS

| | | | | |
|---|---|---|---|---|
| 2,818,909 A | * | 1/1958 | Burnett | 297/216.19 |
| 3,165,355 A | * | 1/1965 | Hitchcock et al. | 297/216.1 |
| 3,214,117 A | * | 10/1965 | James et al. | 244/122 A |
| 3,357,717 A | | 12/1967 | Samford | |
| 3,589,466 A | | 6/1971 | Dudley | |
| 3,774,711 A | | 11/1973 | Lacey | |
| 4,392,546 A | | 7/1983 | Brown et al. | |
| 5,127,706 A | * | 7/1992 | Clark | 297/188.06 |
| 5,131,608 A | * | 7/1992 | Ash et al. | 244/122 A |
| 5,842,737 A | * | 12/1998 | Goor | 297/216.11 |
| 5,947,515 A | * | 9/1999 | Fitch | 280/748 |
| 6,142,563 A | * | 11/2000 | Townsend et al. | 297/216.1 |

FOREIGN PATENT DOCUMENTS

| | | |
|---|---|---|
| DE | 43 37 019 | 5/1995 |
| DE | 195 39 620 | 4/1997 |
| EP | 0 670 237 | 9/1995 |
| FR | 2 608 121 | 6/1988 |

* cited by examiner

Primary Examiner—Paul N. Dickson
Assistant Examiner—David R. Dunn
(74) Attorney, Agent, or Firm—Lawrence E. Laubscher, Sr.

(57) ABSTRACT

When passengers are transported in automotive vehicles, in particular, when automotive vehicles are used in motor sports events, there is an increased risk of injury for the occupants of the vehicle. In particular, if the vehicle is hit from the side, rolls over or catches fire, it is therefore necessary to provide the occupants with optimum protection against the consequences of such an accident. To this end the invention provides a safety seat system comprising a shell element which is secured to a vehicle body and has integrally formed therein a foot area, a seat area and a backrest area, the safety seat being displaceable as a whole relative to the vehicle body upon impacts acting thereon. As a result, the passive safety of an occupant is considerably increased and, in particular, the a consequences of an injury are kept to a minimum or are prevented altogether.

14 Claims, 6 Drawing Sheets

SAFETY SEAT

REFERENCE TO RELATED APPLICATION

This is a continuation application of PCT Application No. PCT/EP00/04356 filed May 15, 2000, which in turn is based on German Application No. 199 22 781.0 filed May 18, 1999.

BACKGROUND OF THE INVENTION

1. Field of the Invention

The present invention relates to the constructional design of a seat, in particular a safety seat for an automotive vehicle. The invention refers to the design of the seat shape, to the mounting of the seat on the car body structure of the vehicle and to the equipment of the seat.

2. Brief Description of the Prior Art

When persons are transported in automotive vehicles, in particular when automotive vehicles are used in motor sports events, there is an increased risk of injury for the occupants of the vehicle because of the high drive speeds and the associated risks of accidents or collisions.

In particular in motor sport racing, such as in touring car racing carried out with roadable vehicles, which are not exclusively conceived for racing, there is the risk that in case of an accident or collision a racing driver or his co-driver will suffer severe injuries.

This is in particular the case when the vehicle is laterally hit by another vehicle and when the passenger compartment is thereby deformed. Also in case of roll-over or when the vehicle catches fire, the occupants of the vehicle are put at a very great risk.

Also in case of a lateral impact the passenger is put at a great risk by lateral body parts penetrating into the passenger compartment because the body structure available for energy absorption is normally very limited.

In known seat systems there is also the risk that the seat moves with the upper part of the occupant towards the vehicle center but that the legs remain in their original position because of the car body structure, whereby the passenger is bent in the area of his pelvis and spine, as shown in FIG. 7a.

In addition, a combined lateral and frontal impact with actuation of the airbag effects a displacement of the position of the occupant's trunk relative to the position of the steering wheel, in particular, due to the lateral displacement of the seat position, so that the effect of the airbag is considerably restricted or prevented. This happens preferably when there is first a lateral impact and then a frontal impact, as shown in FIGS. 6a and 7a.

Also in case of roll-over and a subsequent d formation of the roof structure, the survival room for the occupant is minimized.

SUMMARY OF THE INVENTION

It is therefore the object of the present invention to provide a safety seat which offers optimum protection to the occupants of a vehicle against the consequences of an accident.

This object is achieved according to the invention by a safety seat, in particular for an automotive vehicle, comprising a shell element 2 which is secured to a vehicle body 30 and has integrally formed therein a foot area 4, a seat area 3 and a backrest area 1, the safety seat being displaceable as a whole relative to the vehicle body 30 upon loads acting thereon.

Thanks to the above-described design of the safety seat according to the invention, the passive safety of an occupant in a vehicle is considerably increased; in particular, injuries caused by different types of accidents such as frontal collision, side collision, roll-over or fire are kept to a minimum or prevented altogether.

Since the safety seat is designed such that the foot space is surrounded by a high-strength box-shaped structure which forms a unit with the seat shell proper, it is ensured in the case of a frontal crash that the occupant's legs are protected from injuries and a penetration of vehicle parts into the foot area is ruled out Since a pedal system is also firmly connected to the seat structure, and since a displacement of the pedals relative to the occupant is ruled out, the risk of typical injuries caused by the pedals penetrating into the foot area is reduced.

In the case of a side impact the passive safety is also increased by a safety seat according to the invention because although the body structure for absorbing energy upon a side impact is normally small, the occupant is further protected by the high-strength structure surrounding this person, in particular the side shell of the safety seat which prevents the penetration of lateral body parts into the survival room of the occupant.

Likewise, shear effects between the lower extremities and the upper part of the occupant are prevented by the safety seat in that the foot area is reinforced in box-like configuration and the seat shell proper forms an integral closed structure of a high strength with the foot area, said structure being only displaceable as a whole unit within the vehicle structure in case of a lateral impact.

Due to the integration of a longitudinal column mounting in the structure of the safety seat, the geometrical assignment between the occupant's head and the airbag position is maintained at any rate even upon a combined frontal and lateral impact.

Moreover, the backrest of the safety seat of the invention projects upwards over the occupant's head, so that a sufficient survival room is guaranteed by the structural strength of the seat for the occupants in case of a deformation of the roof structure as a result of a roll-over action.

For preventing extreme lateral head movements of the occupant and for preventing the head from hitting against body parts, an additional lateral head protection is integrated into the seat structure which, like the area of the spine on the seat element, is cushioned with a shock-absorbing foam.

The invention is particularly suited for land, water and air vehicles, i.e. generally for passenger-carrying means. In particular, the invention refers, inter alia, to race boats and aircrafts which only provide a very limited structural protection for occupants due to their extremely lightweight construction.

BRIEF DESCRIPTION OF THE DRAWINGS

The invention shall now be explained in detail in the form of an embodiment with reference to schematic drawings, in which.

DETAILED DESCRIPTION

Figure 1:
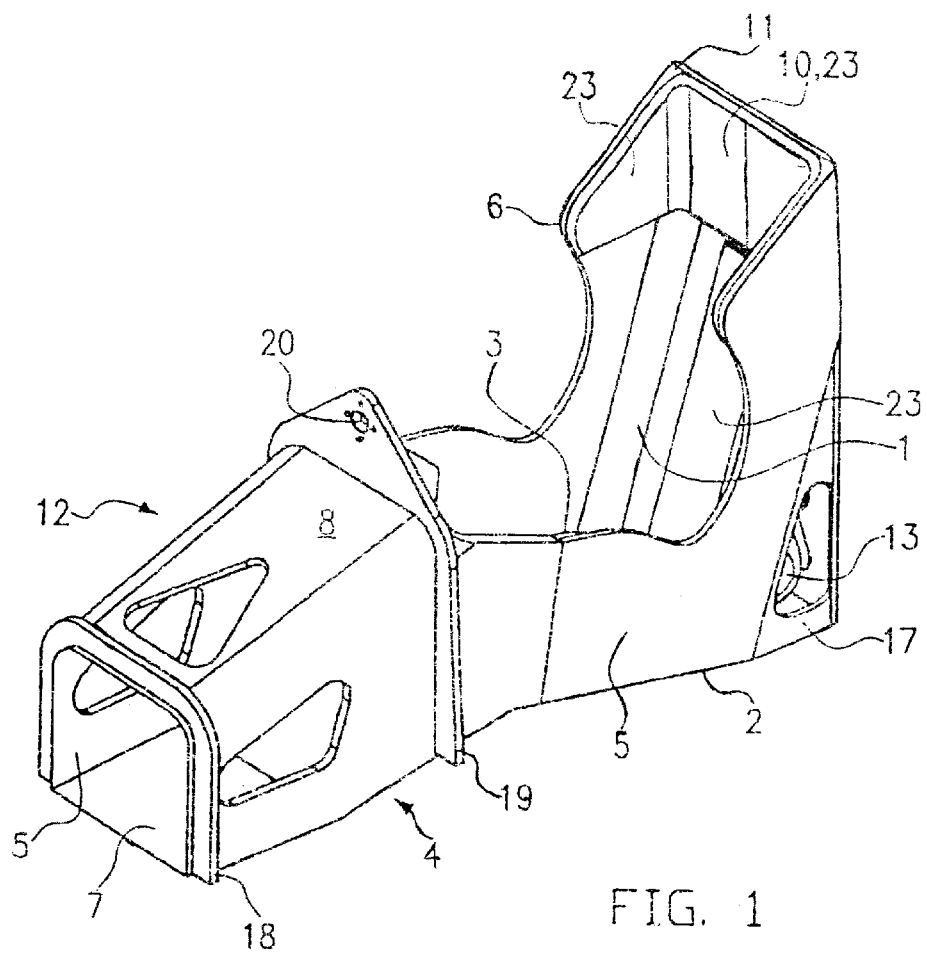
FIG. 1 is a view of a safety seat of the invention taken obliquely from the front.
Figure 2:
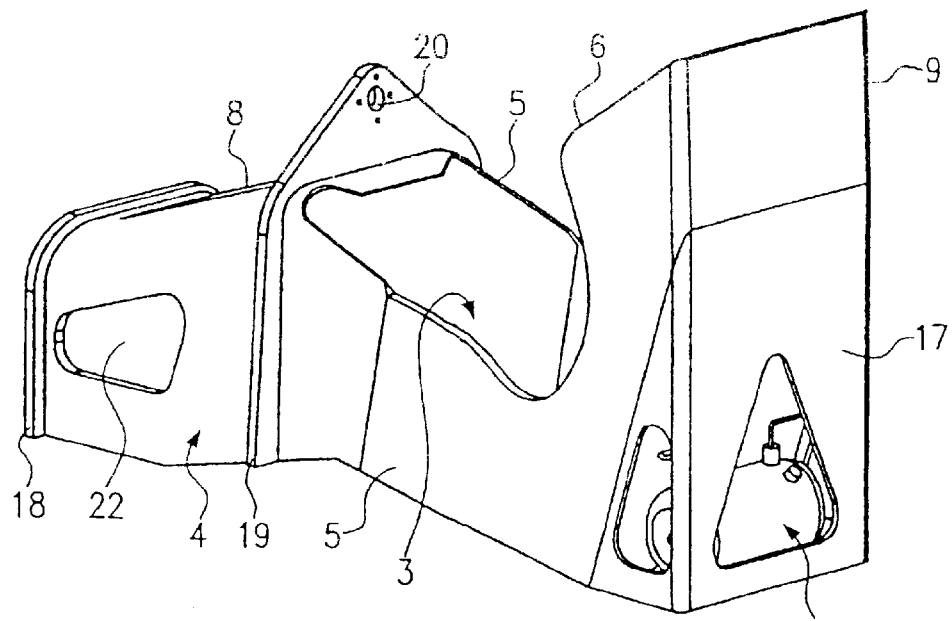
FIG. 2 is a view of a safety seat of the invention taken obliquely from the rear.

As shown in FIGS. 1 to 5, a safety seat according to the invention comprises a shell element 2 having a seat area 3, a backrest area 1 and a foot area 4 integrally formed therein.

The safety seat is here designed such that it is provided in its foot area 4 with an approximately box-shaped structure which is formed from the side walls 5 of the shell element, a bottom wall 7 continuously formed on the bottom side of the whole vehicle seat, and a cover wall 8 connecting the two side walls 5 in the foot area 4. Preferably, the foot area 4 has a conical basic structure which increases from the front to the rear in height and width. The transitional area between the side walls 5 and the cover wall 8 may comprise rounded edges, but may also be of an angular configuration.

In the foot area, both the side walls 5 and the cover wall 8 have a plurality of openings (preferably one in each member) which mainly serve the purpose of ventilation and accessibility from the outside of the foot area 4. The foot area is preferably designed to be open to the front and to the rear, so that circulation is also promoted.

Figure 3:
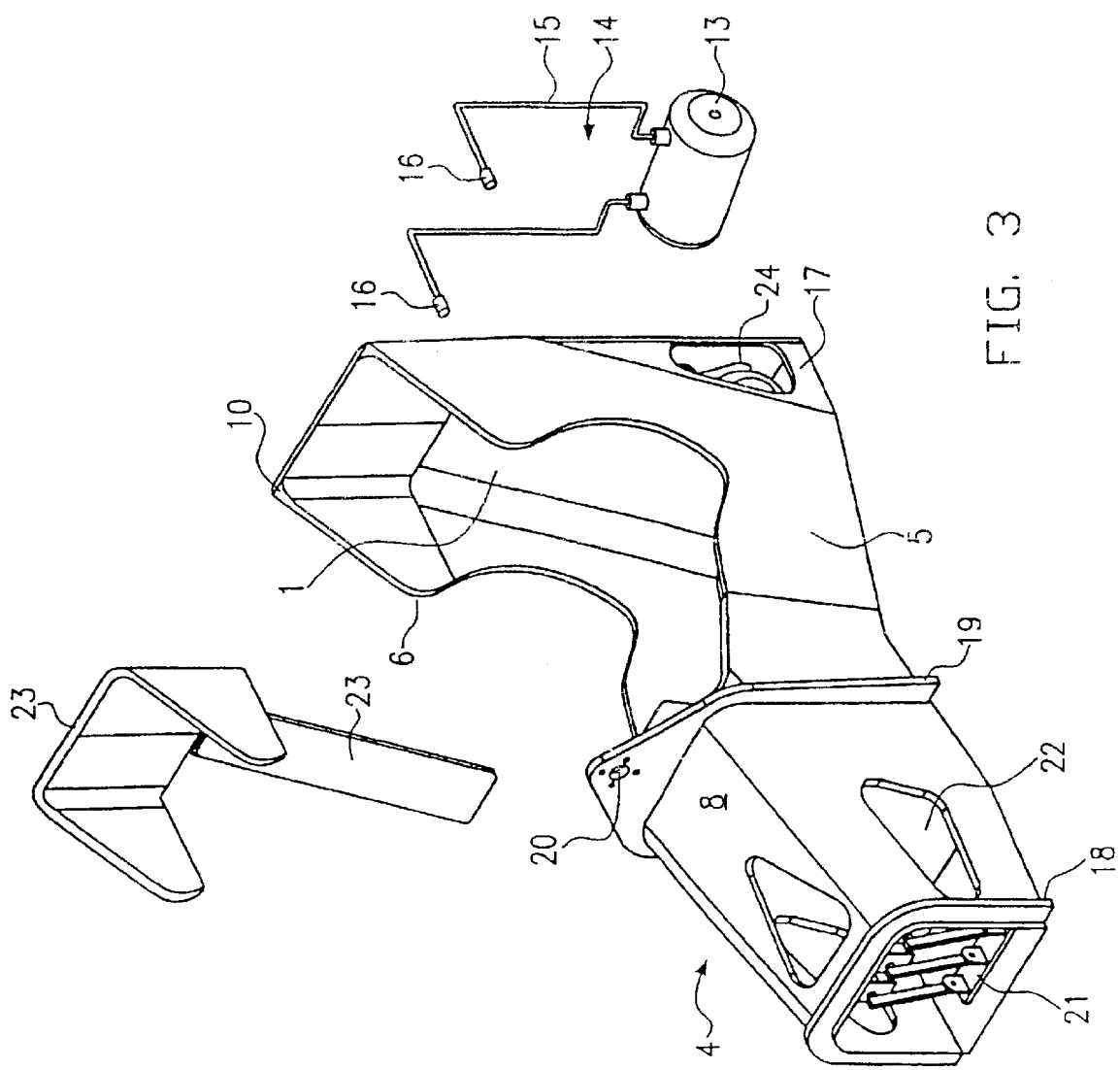
FIG. 3 is an exploded view of individual elements of the vehicle seat of the invention.
Figure 4:
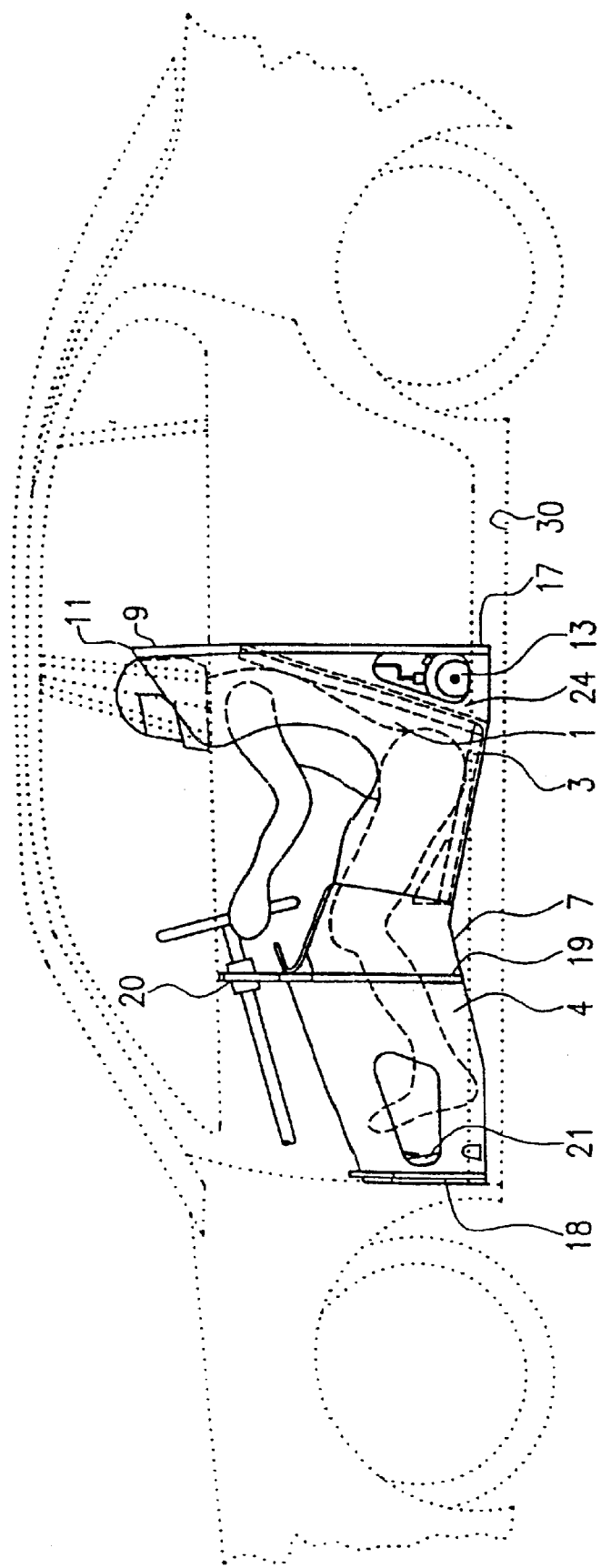
FIG. 4 is a schematic view of the safety seat integrated into an automotive vehicle.
Figure 5:
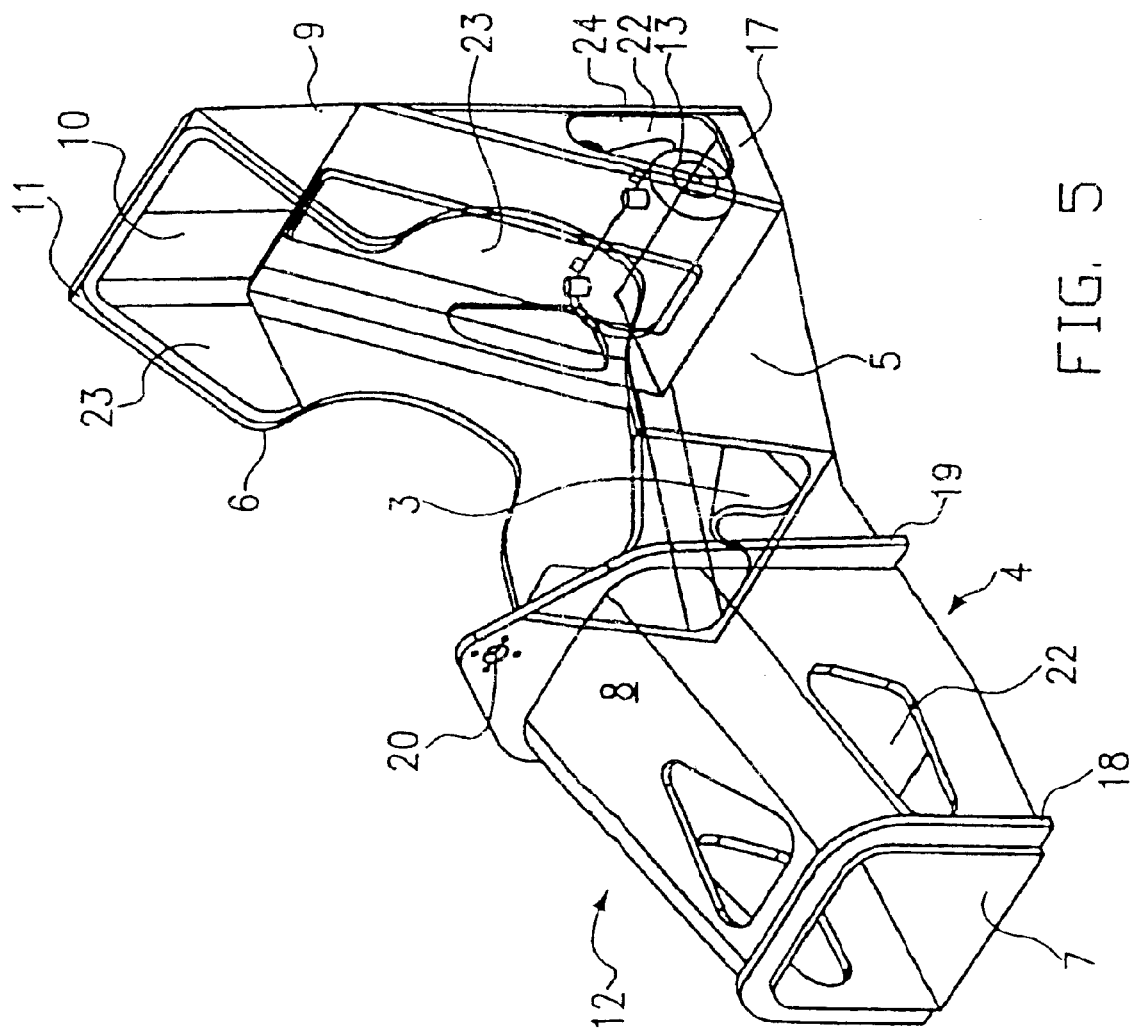
FIG. 5 is a view of the structural design of a safety seat according to the invention.

At the front end of the foot area 4, a pedal system 21, as shown in FIGS. 3 and 4, is firmly connected to the safety seat, preferably to the bottom wall 7. The driving behavior of the vehicle is controllable by the pedal system 21. The pedal system preferably comprises an accelerator pedal, a brake pedal and a clutch pedal. However, additional pedals or operating levers may be arranged in the foot area of the safety seat for further operational functions.

The firm connection of the pedal system to the safety seat ensures that in case of an accident, in particular in the case of a frontal crash, the pedals cannot be pressed into the foot room of the driver in an uncontrolled manner.

At least at its lower end and at its upper end the foot area 4 of the safety seat is equipped with a respective frame-reinforcing element 18, 19 which serves to stiffen the shell element 2.

A lower frame-reinforcing element 18 is here formed in the front foot area, preferably in U-shaped configuration, above the pedal system 21, so that it extends from the bottom wall 7 along the outside of one of the side walls 5 and along the cover wall 8 and along the second side wall 5 back to the bottom wall 7.

Accordingly, an upper frame-reinforcing element 19 is formed at the rear end of the foot area, preferably ending with the rear end of the cover wall 8 of the foot area 4, at a place of the shell element 2 where the foot area passes into the seat area of the safety seat.

The upper frame-reinforcing element 19 differs from the lower frame-reinforcing element 18 insofar as it comprises a steering column bracket 20 in its section arranged above the cover wall 8, preferably in or near a central vertical plane of symmetry of the longitudinal direction of the seat. Said steering column bracket 20 is preferably formed as a through hole in the longitudinal direction of the safety seat to retain a steering column without any displacement on the safety seat.

Figure 6B:
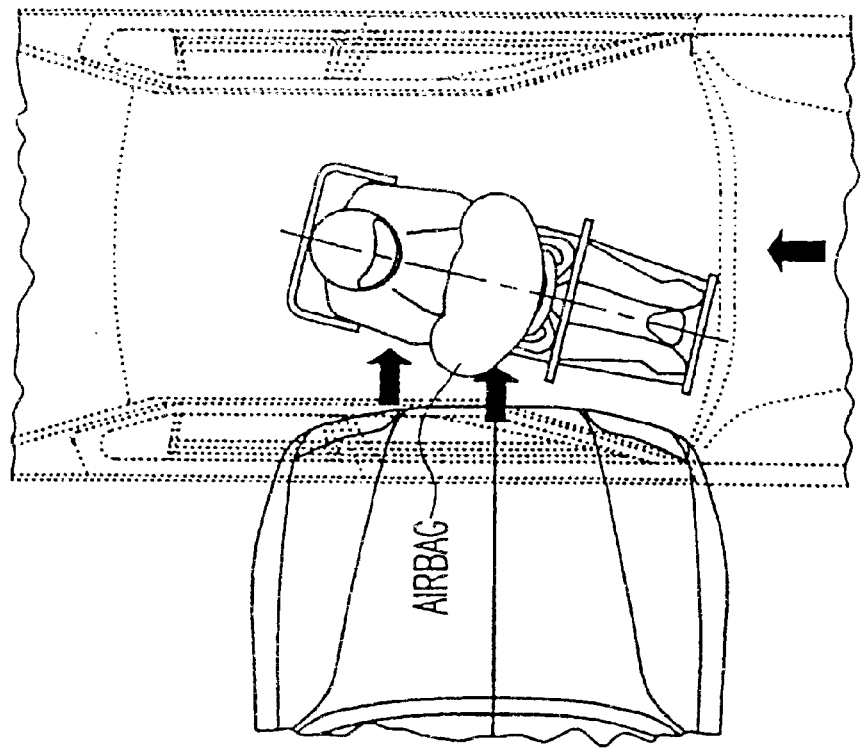
FIGS. 6a, b show a vehicle equipped with a conventional seat and a vehicle equipped with a safety seat according to the invention, each at the time of a frontal collision.
Figure 6A:
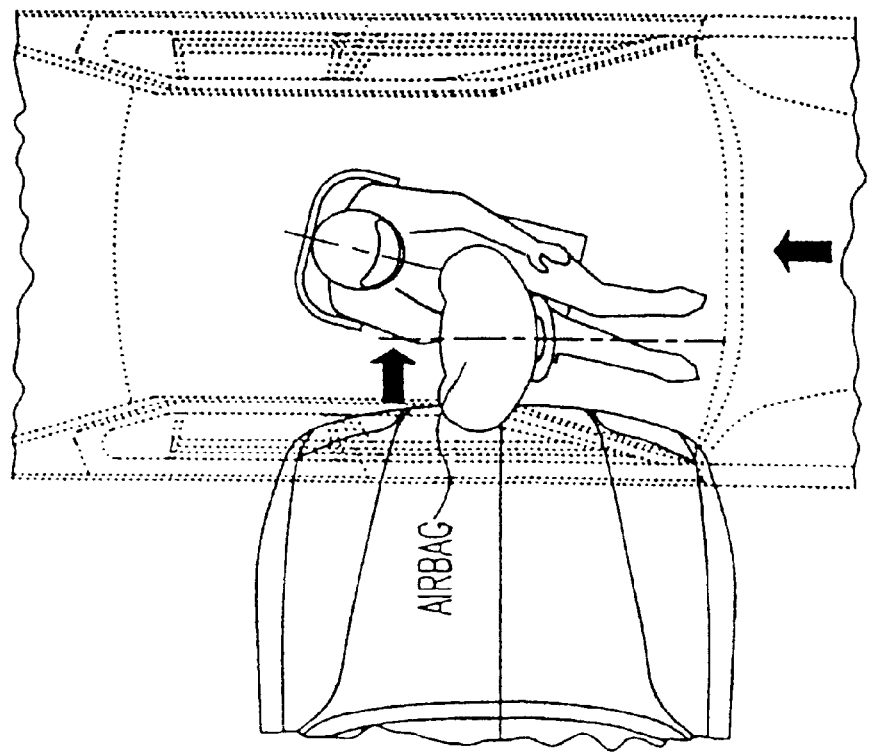
Figure 7B:
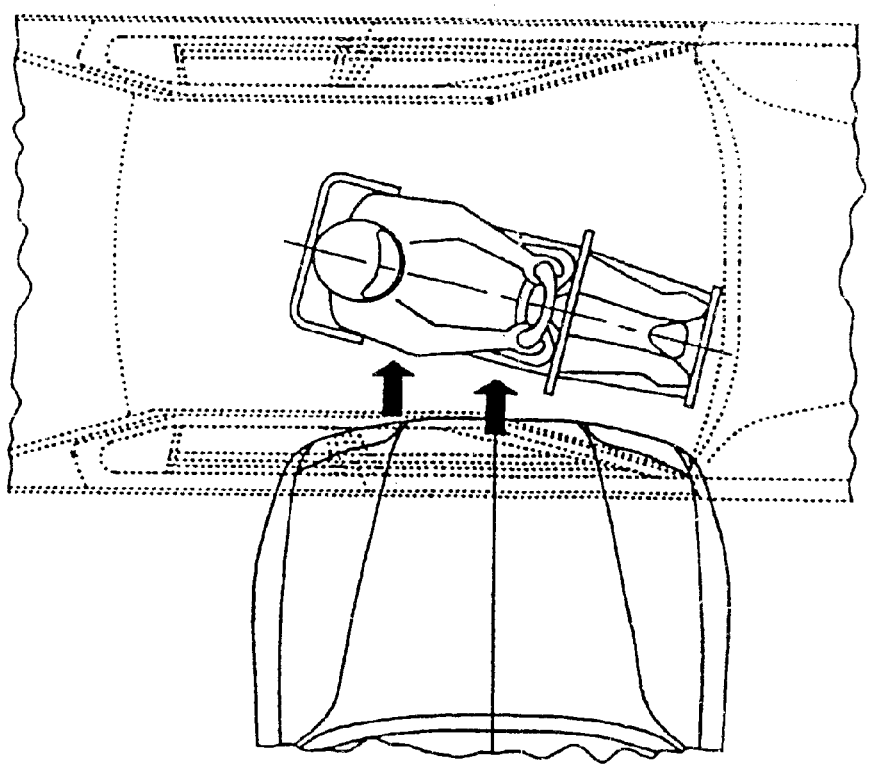
FIGS. 7a, b show a vehicle equipped with a conventional seat and a vehicle equipped with a safety seat according to the invention, each at the time of a combined lateral and frontal collision.
Figure 7A:
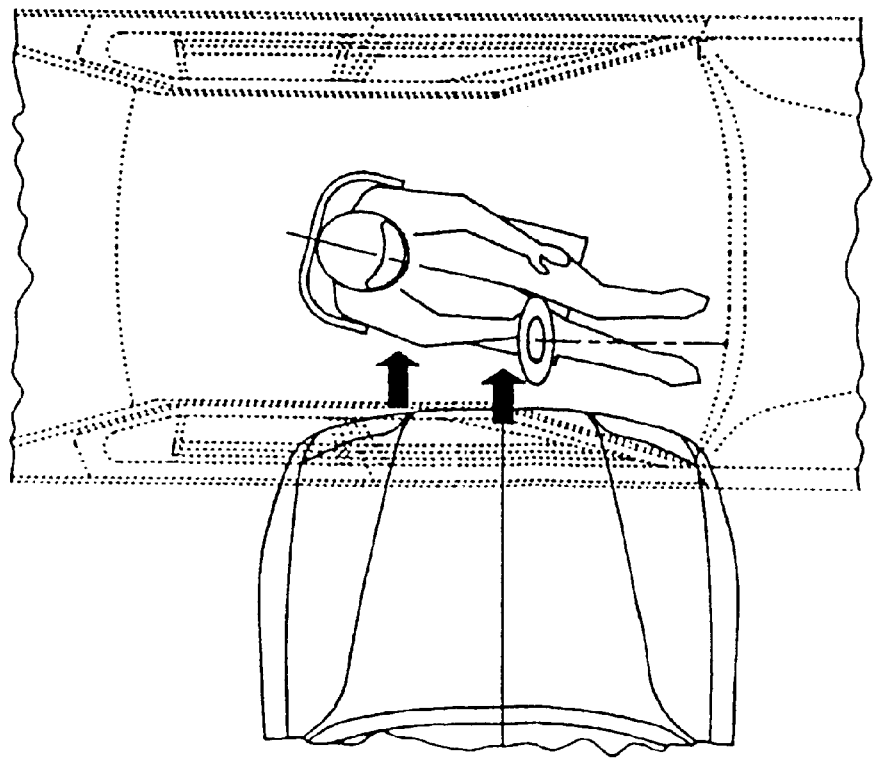

It is thereby ensured that in particular in case of a frontal crash or also a side crash the position of a steering wheel and thus of an airbag positioned therein is maintained relative to the head of the driver or co-driver received in the safety seat, and that, due to the crash, steering column and airbag are moved along with the driver and the safety seat, as shown in FIGS. 6b and 7b.

In the head area of the safety seat, the side walls 5 of the shell element 2 are drawn upwards and forwards, so that they form lateral head rests 6 which prevent the head of the passenger to be flung in case of a side crash of the vehicle in an uncontrolled manner too far to the side, whereby injuries in the cervical area can be avoided.

The lateral head rests 6 of the side walls 5 are here configured to extend upwards to such an extent that they form a roll-over protection 11 together with a rear head rest 10 integrally formed by an upwardly drawn rear wall 9 of the safety seat.

If in the event of a vehicle accident the vehicle rolls over so that the roof is pressed in and an injury of the occupant must be feared because of a reduced head clearance in the passenger cabin, the roll-over protection will always ensure enough headroom for the occupant buckled up in the safety seat in that the roll-over protection 11 counteracts an excessive impression of the vehicle roof by supporting the vehicle seat relative to the bottom of the passenger compartment.

Preferably, the rear area of the backrest of the safety seat is designed as a hollow body. The stiffness of the safety seat is thereby increased and additional stowage space is created at the same time.

To prevent the vehicle occupant from being flung out of his seat in case of such an accident or roll-over, safety belts, similar to felts in a conventional sports car, may be mounted at the left and right side on the seat element 3 or the shell element 2.

In area of seat element 3 and/or the backrest area, which are integrally formed in the shell element 2 of the safety seat, a shock-absorbing element 23, such as a foamed pad web, is provided at least along the central area of the backrest area 3 with a downwardly extending portion 23c for protecting the back of the person to be received.

Likewise, the rear head rest 10 and the lateral head rests 6 are provided at least on their insides with shock-absorbing portions 23a and 23b which effect a padding and an increased protection of the occupants in case of a car crash.

Moreover, a stowage space 24 is formed on the outside of the rear area of the shell element 2, the stowage space 24 being laterally defined by a detachably designed back part 17 to the outside, by the rear side of the backrest area 1 formed in the shell element 2 to the front, and by the side walls 5 of the shell element 2 to the side.

The stowage space serves to stiffen the whole seat structure and to receive a fire-extinguishing agent tank 13 and to reinforce the whole seat structure as part of a fire-extinguishing system 14 which is integrated into the safety seat. A life-saving system is thereby created near the driver, the system being also operative when the vehicle has been severely damaged and car body-based rescue systems of a comparable type do no longer function due to the damage. Furthermore, the fire-extinguishing system 14 comprises a line system 15 which is preferably also integrated into the shell element 2 and can discharge fire-extinguishing fluid via discharge nozzles 16 arranged in the head and body area of the occupant. In addition, a fire detection system is integrated. Thus fire fighting is selectively carried out at the place where the respective occupant of the vehicle is positioned, and said occupant is particularly protected from serious burn injuries due to the preferred arrangement of the discharge nozzles directly above the occupant's head.

An optimum distribution of the fire-extinguishing agent throughout the direct neighborhood of the occupant is achieved through this arrangement of the discharge nozzles along the seat structure. Thanks to the crash-proof arrangement of the fire-extinguishing system within the seat structure, a more reliable fail-safe system is created in case of an accident because feed lines or control cables cannot be torn off by a displacement of the seat relative to the vehicle structure.

The whole safety seat is of a monocoque construction using fiber composites and forming a honeycomb structure or using other suitable materials. It is also extremely lightweight because of said construction so :hat it can be integrated and mounted without any problems in the interior of a vehicle despite its high strength and can easily be lifted out of the vehicle for maintenance work, or the like.

The seat is rigidly connected to the car body structure by suitable fastening elements, e.g. by screwing or gluing, thereby enhancing the overall stiffness thereof. However, the mounting is here made dependent on the load. In case of an overload or an extremely strong load, caused e.g. by a frontal or lateral impact, the safety seat detaches as a whole from the bottom of the passenger compartment and the car body, respectively, thereby moving away from the point of impact, so that the clearance space for the occupant is maintained.

Of course, the use of a safety seat according to the invention is not limited to cars. A use in air and water vehicles is e.g. possible The construction is also not limited to the integration of a single stowage space. For instance, further receiving spaces for electronic communication or control devices are possible in the foot or side area. Likewise, further reinforcement structures or carriers can be integrated into the shell element or connected thereto.

When correspondingly formed fastening elements are detached, the victim of an accident can be rescued with the whole seat after a standard separation of the roof structure. For instance, spinal injuries caused by the rescuing operation can thereby be prevented.

What is claimed is:

1. A safety seat for protecting the occupant of a vehicle, comprising:

(a) a unitary shell (2) adapted for connection with the body (30) of a vehicle, said shell including:
      (1) means defining a foot area (4);
      (2) means defining a seat area (3); and
      (3) means defining a backrest area (1);
      (4) each of said area defining means being integral with said shell;
      (5) said shell being connected for displacement as a unit relative to the vehicle body;
      (6) said foot area defining means comprising a box-shaped structure (12) including:
         (a) a pair of parallel spaced vertical side walls (5);
         (b) a generally horizontal bottom wall (7) connected between said sidewalls and extending beneath said foot area; and
         (c) a generally horizontal cover wall (8) connected between said side walls in spaced relation above said bottom wall.

2. A safety seat as defined in claim 1, said bottom wall extends also beneath said seat area and said backrest area, thereby to completely close the bottom of the shell.

3. A safety seat as defined in claim 1, wherein said side walls extend upwardly adjacent the head of an occupant for use as lateral head rests (6).

4. A safety seat as defined in claim 3, wherein said back rest defining means includes a vertical rear wall (9), and further wherein said shell includes a roll over protection portion (11) that extends upwardly from said rear wall to an elevation higher than the head of the vehicle occupant.

5. A safety seat as defined in claim 4, and further including a shock-absorbing element (23) having first and second portions adjacent the inner surface of said shell roll-over protection portion and the inner surfaces of said lateral head rests, respectively.

6. A safety seat as defined in claim 5, wherein said shock-absorbing element includes a third portion that extends downwardly adjacent the inner surface of said rear wall.

7. A safety seat as defined in claim 4, wherein said backrest defining means includes detachable means (17) defining a chamber behind said rear wall, and a fire extinguishing system (14) mounted in said chamber.

8. A safety seat as defined in claim 1, and further including at least one frame-reinforcing element (18, 19) for reinforcing said shell adjacent said foot area.

9. A safety seat as defined in claim 8, wherein a pair of said frame-reinforcing elements is provided, each of said reinforcing elements extending successively from said bottom wall (7), along a first one of said side walls, over said cover wall, along the other of said side walls, and back to said bottom wall.

10. A safety seat as defined in claim 9, wherein one of said frame-reinforcing means includes bracket means (20) for fastening said frame-reinforcing means to the steering column of said vehicle.

11. A safety seat as defined in claim 1, and further including vehicle control pedal means (21) arranged in said shell foot area.

12. A safety seat as defined in claim 1 wherein said shell foot area comprises an open ended box-shaped structure (12).

13. A safety seat as defined in claim 1 wherein said shell is formed from a synthetic plastic composite material having a monocoque honeycomb structure.

14. A safety seat for protecting the occupant of a vehicle, comprising:
  (a) a unitary shell (2) adapted for connection with the body (30) of a vehicle, said shell including:
    (1) means defining a foot area (4);
    (2) means defining a seat area (3); and
    (3) means defining a backrest area (1);
    (4) each of said area defining means being integral with said shell;
    (5) said shell being connected for displacement as a unit relative to the vehicle body;
    (6) said foot area defining means comprising a box-shaped structure (12) including:
      (a) a pair of parallel spaced vertical side walls (5);
      (b) a generally horizontal bottom wall (7) connected between said side walls and extending beneath said foot area; and
      (c) a generally horizontal cover wall (8) connected between said side walls in spaced relation above said bottom wall;
    (7) said backrest area including a vertical rear wall, and means (17) defining a chamber behind said rear wall; and
  (b) a fire-extinguishing system including a tank (13) arranged in said chamber, said tank containing a fire-extinguishing fluid, and conduit means (15) containing nozzle means (16) for discharging the fire-extinguishing fluid from said tank onto an occupant of the vehicle.

* * * * *